(12) United States Patent
Eiselt

(10) Patent No.: US 11,852,512 B2
(45) Date of Patent: Dec. 26, 2023

(54) OPTICAL SENSORS INTERROGATION DEVICE AND METHOD

(71) Applicant: ADVA Optical Networking SE, Meiningen (DE)

(72) Inventor: Michael Eiselt, Kirchheim (DE)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 17/683,522

(22) Filed: Mar. 1, 2022

(65) Prior Publication Data

US 2022/0283000 A1    Sep. 8, 2022

(30) Foreign Application Priority Data

Mar. 5, 2021 (EP) .................................... 21161091

(51) Int. Cl.
*G01D 5/353* (2006.01)
*G01K 11/32* (2021.01)

(52) U.S. Cl.
CPC ......... *G01D 5/35329* (2013.01); *G01K 11/32* (2013.01)

(58) Field of Classification Search
CPC ........... G01D 5/35329; G01D 5/35316; G01D 5/268; G01K 11/32
USPC .................................................... 250/227.14
See application file for complete search history.

(56) References Cited

U.S. PATENT DOCUMENTS

| 10,784,958 | B2 | 9/2020 | Eiselt |
| 11,307,104 | B2 | 4/2022 | Eiselt et al. |
| 2010/0014071 | A1 | 1/2010 | Hartog |
| 2017/0010385 | A1* | 1/2017 | Englich ................. G01H 9/004 |

FOREIGN PATENT DOCUMENTS

| EP | 3578946 A1 | 12/2019 |
| EP | 3715807 A1 | 9/2020 |

* cited by examiner

*Primary Examiner* — Thanh Luu
*Assistant Examiner* — Mai Thi Ngoc Tran
(74) *Attorney, Agent, or Firm* — The Webb Law Firm

(57) ABSTRACT

In a method for interrogating at least one optical sensor coupled to an optical path, at least two time-shifted optical signals are fed into the optical path and reflected optical signals of the at least two probe signals created by the at least one optical sensor are detected. Each detected reflected optical signal is assigned to one of the at least one optical sensor and a correct optical frequency is assigned to each detected reflected optical signal. An absolute value or a value range or a change of a value or value range of the parameter to be sensed is determined from the one or more of the following physical conditions: the optical reflection signals, the reflectivity of the at least one optical sensor, and the frequency of each detected optical reflection signal, or from one or more dependencies that link these physical conditions.

16 Claims, 10 Drawing Sheets

| (A) | Pulse sequence | 1 | 1 | 1 | 0 | 1 | 1 | 1 | 1 | 1 | 1 | 0 | 1 | 0 | 1 | 1 | 1 | 1 | 0 | 1 | 1 |
|---|---|---|---|---|---|---|---|---|---|---|---|---|---|---|---|---|---|---|---|---|---|
| (B) | 4-bit shifted sequence | 0 | 0 | 0 | 0 | 1 | 1 | 0 | 1 | 1 | 1 | 0 | 1 | 1 | 1 | 0 | 0 | 1 | 1 | 0 | 1 |
| (C) | (A) multiplied with (+/-)-sequence, period 20 | 1 | 1 | 1 | 0 | 1 | 1 | 1 | 0 | -1 | -1 | 0 | -1 | 0 | -1 | -1 | 1 | 1 | 0 | 1 | 1 |
| (D) | (B), multiplied with (+/-)-sequence | 0 | 0 | 0 | 0 | 1 | 1 | 0 | -1 | -1 | -1 | 0 | -1 | 1 | 1 | 0 | 0 | -1 | -1 | 0 | 1 |
| (E) | (C)+(D) | 1 | 1 | 1 | 0 | 2 | 2 | 1 | -1 | -2 | -2 | 0 | -2 | 1 | 0 | -1 | 1 | 0 | -1 | 1 | 2 |

Fig. 6

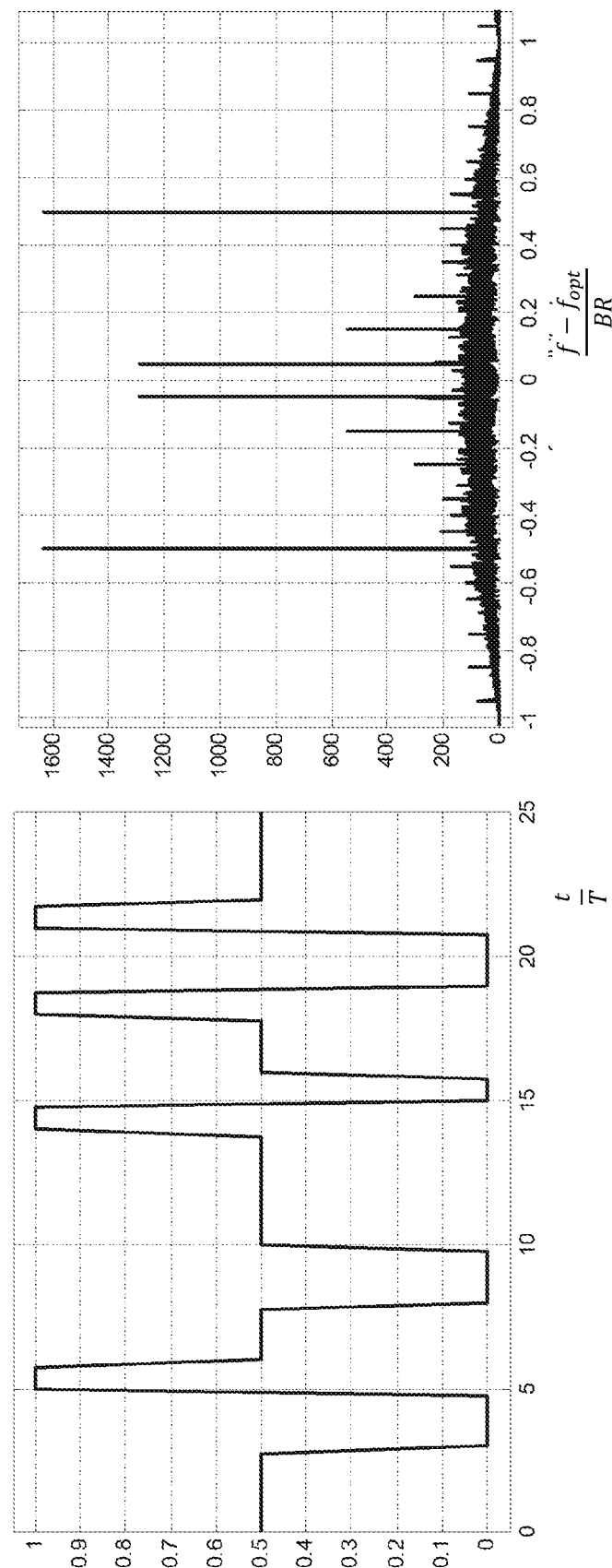

| | | | | | | | | | | | | | | | | | | | | | |
|---|---|---|---|---|---|---|---|---|---|---|---|---|---|---|---|---|---|---|---|---|---|
| (A) | pulse sequence | 1 | 1 | 0 | 1 | 1 | 1 | 0 | 1 | 1 | 0 | 0 | 1 | 1 | 1 | 1 | 0 | 1 | 1 | 0 | 1 |
| (B) | 4-bit shifted pulse sequence | 0 | 0 | 1 | 1 | 1 | 1 | 0 | 1 | 1 | 1 | 1 | 0 | 0 | 0 | 1 | 0 | 0 | 1 | 1 | 0 |
| (C) | (A) multiplied with (+/−)-sequence of period 20 | 1 | 1 | 0 | 1 | −1 | 1 | 0 | 1 | −1 | 0 | 0 | −1 | −1 | 1 | 1 | 0 | 1 | 1 | 0 | 1 |
| (D) | (B) multiplied with cosine of period 4 | 0 | 0 | 0 | 0 | 0 | −1 | 0 | 1 | 0 | −1 | 0 | 0 | 0 | 0 | −1 | 0 | 0 | 1 | 0 | 0 |
| (E) | (B) multiplied with sine of period 4 | 0 | 0 | 1 | 0 | −1 | 0 | 0 | 0 | 1 | 0 | −1 | 0 | 0 | 0 | 0 | 0 | 0 | 0 | −1 | 0 |
| (F) | I=(C)+(D) | 1 | 1 | 0 | 1 | −1 | 0 | 0 | 2 | −1 | −1 | 0 | −1 | −1 | 1 | 0 | 0 | 1 | 2 | 0 | 1 |
| (G) | Q=(C)+(E) | 1 | 1 | 1 | 1 | −2 | 1 | 0 | 1 | 0 | 0 | −1 | −1 | −1 | 1 | 1 | 0 | 1 | 1 | −1 | 1 |

Fig. 9

OPTICAL SENSORS INTERROGATION DEVICE AND METHOD

CROSS-REFERENCE TO RELATED APPLICATION

This application claims priority to European Patent Application No. 21 161 091.0 filed Mar. 5, 2021, the disclosure of which is hereby incorporated by reference in its entirety.

BACKGROUND OF THE INVENTION

Field of the Invention

The invention relates to a method and a device for interrogating at least one optical sensor that is provided within or connected to an optical path, wherein the at least one optical sensor has a known frequency-dependent course of its reflectivity that is changed by a physical parameter to be sensed, especially the temperature or humidity of the environment or the concentration of a substance (as the case may be, diluted in a medium) surrounding the optical sensor or the pressure being exerted onto the optical sensor.

Description of Related Art

Usually, interrogating a sensor of this type is performed in the frequency domain. For this, it is known to send a broadband optical probe signal into the optical path, e.g. an optical fiber, in which the optical sensor is provided or to which the optical sensor is coupled. Only such spectral signal components are reflected which lie within the sensor frequency range in which the reflectivity is different from zero (sensor reflectivity range). At the receiver, which is provided at the same end as the optical transmitter, a spectral analysis of the reflected signal components yields the peak of the sensor reflectivity, e.g. the Bragg frequency of a fiber Bragg grating based optical sensor. In an alternative setup, an optical probe signal is sent into the fiber, and the optical frequency of the signal is swept. Only if the optical frequency of the signal lies within the sensor reflectivity range, a reflected signal is detected. A drawback of these methods is that either a spectrometer or a tunable transmitter is required, which increases the costs of a corresponding equipment. Also, the methods per se do not allow to interrogate multiple sensors that are provided within the optical path or connected thereto. Distinguishing between the sensors would require additional time-dependent signals (pulses) and a recording of the reflected signals over time.

Starting from these known techniques, the present invention has the object to provide a simplified method and device for interrogating at least one optical sensor of the above-identified kind, wherein especially no spectral analysis or optical frequency discrimination is required at the optical receiver.

The invention achieves these objects with the combination of features as described herein. Further embodiments of the invention are apparent from the depending claims.

SUMMARY OF THE INVENTION

The invention starts from the finding that optical time domain reflectometry (OTDR) may be applied for interrogating optical sensors that reveal an optical spectrum (the course of) which depends on a physical parameter to be detected. The method according to the invention uses at least two optical probe signals at differing optical frequencies. The two or more optical probe signal are delayed with respect to each other by a predetermined delay time, e.g. a few nanoseconds (depending on the pulse widths), and have different optical (center) frequencies. The two or more optical frequencies are in the range of the reflection spectrum of the at least one optical sensor, e.g. in the range of the Bragg frequency of an optical fiber Bragg grating (FBG) sensor, more exactly, in the frequency range that is covered by the sensor spectrum if the parameter to be sensed is varied over the whole predetermined parameter range in which the sensor shall fulfill its sensing task.

The sensor reflects one or more wavelengths with a power depending on the actual (i.e. parameter-depending) shift of its reflection spectrum and the course or form of the reflection spectrum, which is generally essentially independent of the shift. The reflection spectrum may be described by a filter function, e.g. a Gaussian filter function. The reflected pulses (designated as optical reflection signals) are recorded by a single receiver using simple direct detection (i.e. no coherent detection is required), and the time positions of the recorded optical reflection signals are a measure of the optical frequency thereof. A shift of the center of the sensor reflectivity range changes the optical power of the at least two optical probe signals, as, in general, the reflectivity varies over the course of the reflection spectrum. Thus, the presence and/or the absolute maximum value of the power (or the energy) of the optical reflection signals, as the case may be, compared to a calibration value or calibration dependency, or one or more relationships between the reflected portions of the at least two optical probe signals (optical reflection signals) can be used to measure or at least obtain information about the parameter to be sensed. Especially the quotient of the maximum power or energy of two reflection signals detected may serve as a measure for the shift of the reflection spectrum and thus as a measure for the physical parameter to be sensed.

If the optical frequencies of the two or more probe signals are chosen in such a way that their spectral distance is greater than the width of the sensor reflection spectrum, a sufficiently large change of the parameter to be sensed is observed as a time shift of the reflected signal, as the actually reflected probe signal fully disappears before the (spectrally) neighboring probe signal appears. In such embodiments, the frequency shift of the reflection spectrum of an optical sensor due to the change of a measurement parameter, i.e. the physical parameter to be sensed, is converted into a time shift of the probe signal received.

Assigning an optical frequency to the reflection signals detected using the known time shift between the at least two optical probe signals results in a reduced complexity of the measurement setup as no frequency discriminator is required at the receiver.

In a basic setup, an OTDR device comprising an optical transmitter can be used which creates at least two optical probe signals each consisting of a single pulse having a predetermined length of e.g. several nanoseconds. A better spatial resolution of e.g. down to about one centimeter (corresponding to a temporal resolution of approximately 100 ps) can be achieved using a correlation OTDR method/device, where instead of a single rather long probe pulse a series of pulses based on a predetermined bit sequence is sent. Such correlation OTDR methods can be used in order to simultaneously interrogate cascaded multiple optical sensors, which may be positioned as close as only a few centimeters.

The method according to the invention thus comprises the steps of (a) feeding at least two optical probe signals having differing optical center frequencies to the near end of the optical path, wherein the at least two optical probe signals are time-shifted versus each other in a predetermined manner when being fed to the near end of the optical path, or wherein a predetermined time shift between the at least two optical probe signals is introduced within the optical path or within an optical receiver using chromatic dispersion, e.g. by means of a chromatic dispersion creating component; in other words, the at least two optical probe signals may already be time-shifted versus each other when being fed to the optical path or the time shift may be created within the optical path (before or after the at least one optical sensor) or even after the optical reflection signals have been fed to the optical receiver;

(b) detecting reflected optical power portions of the at least two probe signals (optical reflection signals) created by the at least one optical sensor depending on its frequency-dependent course of the reflectivity and the optical frequencies of the at least two optical probe signals, assigning each optical reflection signal detected to one of the at least one optical sensor and assigning the correct optical frequency to each optical reflection signal detected using a known round-trip delay of the at least two optical probe signals between the near end and the respective sensor position and/or using the time shift relation between the at least two optical probe signals (of course, the knowledge of the optical frequencies of the at least two optical probe signals is also used to determine the optical frequencies of the reflection signals); if only a single optical sensor is interrogated and if two reflection signals are detected, it can be concluded that both reflection signals are created by the sensor and that the first and the second reflection signals have the optical frequencies of the first and the second optical probe signals, respectively, at least if other reflections can be excluded. However, even in this case, examining whether the point in time at which a reflection signal is detected minus the round-trip delay corresponds to the time at which an optical probe signal has been fed to the optical path reduces the error rate; once an optical reflection signal has been identified in this way to be created from a certain optical probe signal (and thus the optical reflection signal has the optical frequency of the respective optical probe signal), other optical reflection signals (and their optical frequencies) that are created by the same sensor can also be identified using the known time shift of the respective optical probe signals;

(c) determining an absolute value or a value range or a change of a value or value range of the parameter to be sensed using the presence of one or more of the optical reflection signals or the maximum optical power or the optical energy thereof, the frequency-dependent course of the reflectivity of the at least one optical sensor and its dependency on the parameter to be sensed, and the optical frequency of each of the optical reflection signals detected or using one or more dependencies that link these physical conditions; for example, if the optical frequencies of two optical probe signals differ more than the width of the reflection spectrum of an optical sensor, only one of the possible reflection signals can be detected, depending on the shift of the sensor reflection spectrum; such a dependency may then link the presence of each of the reflection signals to a dedicated state or range of the physical parameter to be sensed; for example, the concentration of a gas surrounding a gas-sensitive optical sensor is determined to exceed a given threshold if a second one of the two possible reflection signals is detected and is determined to be below the same or another (lower) threshold if the first one of the two possible reflection signals is detected; of course, also more complex dependencies may be used that translate absolute or relative values of reflection signals detected (e.g. their maximum optical power or optical energy) into a dedicated shift of the optical reflection spectrum and this shift to a dedicated value of the parameter to be sensed.

Generally, there are various options to generate the multi-frequency signal: A straightforward method is to create synchronized but time-shifted pulses that are modulated onto multiple optical sources, e.g. by directly modulating lasers at predetermined optical frequencies.

According to an embodiment of the invention, the at least two optical probe signals are identical in terms of their course over time apart from a given time shift. This reduces the effort for creating the pulses or series of pulses forming the optical probe signals. Further, if a correlation OTDR technique is used for detecting the optical reflection signals, the correlation must be carried out with only a single bit pattern, namely, the bit pattern that is used to create the time-shifted optical probe signals at the differing optical frequencies.

In another embodiment, the at least two optical probe signals are digital optical signals each comprising a predetermined number of bits having a given bit duration and the optical reflection signals detected are correlated with a bit sequence identical (in terms of the course over time) to the bit sequence underlying the optical probe signals, i.e. the bit sequence that is used to create the optical probe signals. In this embodiment, the amplitudes of the correlation peaks determined (which are a measure of the energy of the optical reflection signals detected) are used in order to determine the absolute value or the value range or the change of the value or value range of the parameter to be sensed.

According to an embodiment of the invention, the two or more optical probe signals are created by using a modulating signal comprising a first pulse sequence and at least one further pulse sequence, wherein each further pulse sequence is an image of the first pulse sequence that is time-shifted by a respective differing time shift of at least one bit and on which a respective differing constant phase slope is applied, and wherein the two or more pulse sequences may further differ by a complex amplification factor, and by using this modulating signal to optically modulate a single optical carrier signal having a predetermined optical frequency. That is, the multiple time-shifted signals are modulated onto the output of a single optical source (e.g. a laser) in a single modulator, wherein each time-shifted signal is created by modulating an additional phase pattern onto the respective pulse sequence so that, at the output of the modulator, multiple optical frequencies are present carrying the time-shifted optical probe pulses. This drastically reduces the circuitry of a suitable optical transmitter as only a single optical source creating an optical carrier at a single optical frequency is required.

In a further development of such an embodiment, the complex amplification factor is chosen in such a way that the optical power portions comprised within the respective optical probe signals are essentially equal.

Two optical probe signals may be created by using 10-modulation, wherein an in-phase component of the modulating signal, which is equal to the real part of a complex representation of the sum of a first and a second pulse sequence, is used as an in-phase modulating signal component, and wherein a quadrature component of the modulating signal, which is equal to the real part of a complex representation of the sum of the first and second pulse sequence, is used as a quadrature modulating signal component.

According to a specific embodiment, the in-phase component of the modulating signal is created by using a binary bit sequence having a predetermined number of bits, wherein the binary bit sequence or a bias-free version of the binary bit sequence and a time-shifted image of the binary bit sequence that has been multiplied with a cosine of a given period are added, and the quadrature component of the modulating signal is created by using the binary bit sequence, wherein the binary bit sequence or a bias-free version of the binary bit sequence and a time-shifted image of the binary bit sequence that has been multiplied with a sine of the given period are added. The period of the cosine and sine may be 4 so that the cosine and sine may be represented by a pulse sequence consisting of consecutive [1, 0, −1, 0] and [0, 1, 0, −1] periods, respectively.

In another alternative to create two optical probe signals using a single optical source at a specified optical frequency, the two optical probe signals are created by using a Mach-Zehnder modulator, wherein the modulating signal is created by using a binary bit sequence having a predetermined number of bits, wherein the binary bit sequence or a bias-free version of the binary bit sequence and a time-shifted image of the binary bit sequence that has been multiplied with a plus-minus bit sequence are added, and wherein the modulating signal is fed to the Mach-Zehnder modulator (MZM). Preferably, push-pull modulation is used.

The time-shifted binary bit sequence may be multiplied by a constant factor, preferably by 1.4, in order to obtain more equal amplitudes of the correlation peaks that are obtained when correlating the respective reflection signals with the binary bit sequence.

To achieve a bias-free drive signal that is supplied to the MZM, a (+/−)-phase modulation can be superimposed to each of the time-shifted sequences. When a long period for this modulation is used (e.g. 100 times plus, followed by 100 times minus), the frequency shift is very small, but still the sequence is nearly bias-free.

It is also possible to use oversampling in such embodiments, i.e. the binary bit sequences are represented by two or more equidistant samples per bit. If consecutive samples of the time-shifted bit sequence are multiplied with a plus-minus bit sequence of a period of two, frequency components at ±half the sampling rate are obtained, which is the maximum frequency shift that can be obtained. It shall, however, be mentioned that also other periods of plus-minus bit sequence are possible, even a non-constant period created by switching between two or more values for the period, so that onaverage not an integer value of the period can be obtained (of course, this type of phase modulation can also be used without oversampling). Oversampling may be used in all embodiments in which the frequency shift of one of the at least two optical probe signals is created by modulating a common optical carrier with a modulating signal having appropriate modulating signal components for each of the optical probe signals to be created.

According to another embodiment, the absolute value or a value range or a change of a value or value range of the parameter to be sensed is determined by calculating an assessment dependency comprising at least one ratio of amplitudes of the reflection signals detected, translating the assessment dependency to a frequency shift of the frequency-dependent course of the reflectivity of the at least one optical sensor from a center position using a translation dependency that is obtained by a calibration process or by simulation, and translating the frequency shift to the absolute value or a value range or the change of the value or value range of the parameter to be sensed using a further translation dependency that is obtained by a calibration process or by simulation.

The at least one assessment dependency that may be used in such an embodiment may have the form $$RP_\varphi = \arctan\frac{C_2}{C_1} + \text{sign}(C_2) \cdot [1 - \text{sign}(C_1)] \cdot \frac{\pi}{2}$$

wherein $C_1$, $C_2$ designate amplitudes of the reflection signals detected, sign designates the signum function and $RP_\varphi$ designates an angle ratio parameter. This dependency uses the angle of the complex ratio parameter $RP=C_1+jC_2$ to combine the amplitudes of two optical reflection signals and further solves the problem that, on the one hand, $C_1$ can be zero and, on the other hand, that the arctan function is defined in the range of $]\pi/2; +\pi/2[+k\cdot\pi$, only (k being a positive or negative integer number). A device according to the present invention for interrogating an optical sensor of the above-explained type comprises a connection port configured to be connected to the near end of the optical path, an optical transmitter configured to create at least two optical probe signals having differing optical center frequencies and to feed the at least two optical probe signals to the near end of the optical path, an optical receiver configured to detect reflected optical power portions of the at least two probe signals (optical reflection signals) created by the at least one optical sensor depending on its frequency-dependent course of the reflectivity and the optical frequencies of the at least two optical probe signals; and a control device. The control device is connected to the optical transmitter and the optical receiver and is configured to assign each optical reflection signal detected to one of the at least one optical sensor and the correct optical frequency to each optical reflection signal detected using a known round-trip delay of the at least two optical probe signals between the near end and the respective sensor position and/or using the time shift relation between the at least two optical probe signals, and to determine an absolute value or a value range or a change of a value or value range of the parameter to be sensed from the presence of one or more of the optical reflection signals or the maximum optical power or the optical energy thereof, from the frequency-dependent course of the reflectivity of the at least one optical sensor and its dependency on the parameter to be sensed, and from the optical frequency of each of the reflection signals detected or from one or more dependencies that link these physical conditions.

According to an embodiment, the optical transmitter may be configured to create the at least two optical probe signals in such a way that they are time-shifted versus each other in a predetermined manner when being fed to the near end of the optical path.

Alternatively, the optical transmitter may be configured to create the at least two optical probe signals simultaneously revealing no time shift. In such embodiments, a chromatic dispersion generating component may be provided within the optical path or within the optical receiver in order to create a predetermined time shift between the optical probe signals or the optical reflection signals, respectively.

Of course, in general, the optical transmitter, the optical receiver and the control device are configured to carry out the method according to one or more embodiments described above.

BRIEF DESCRIPTION OF THE DRAWINGS

In the following, the invention will be described in more detail with reference to the drawings. In the drawings.

FIG. 6 shows a table explaining the steps of creating a modulating signal for a Mach-Zehnder-modulator that is used in an optical transmitter for simultaneously creating two time-shifted optical pulse sequences as optical probe signals;

FIG. 7 shows a diagram that displays the ternary optical signal as a function of time that is created by overlapping the two optical probe signals created according to the pulse sequence example in FIG. 6;

FIG. 8 shows the optical spectrum of the optical probe signals according to FIG. 7;

FIG. 9 shows a table explaining the steps of creating an in-phase and a quadrature modulating signal for an IQ-modulator that is used in an optical transmitter for simultaneously creating two time-shifted optical pulse sequences as optical probe signals;

DESCRIPTION OF THE INVENTION

Figure 1:
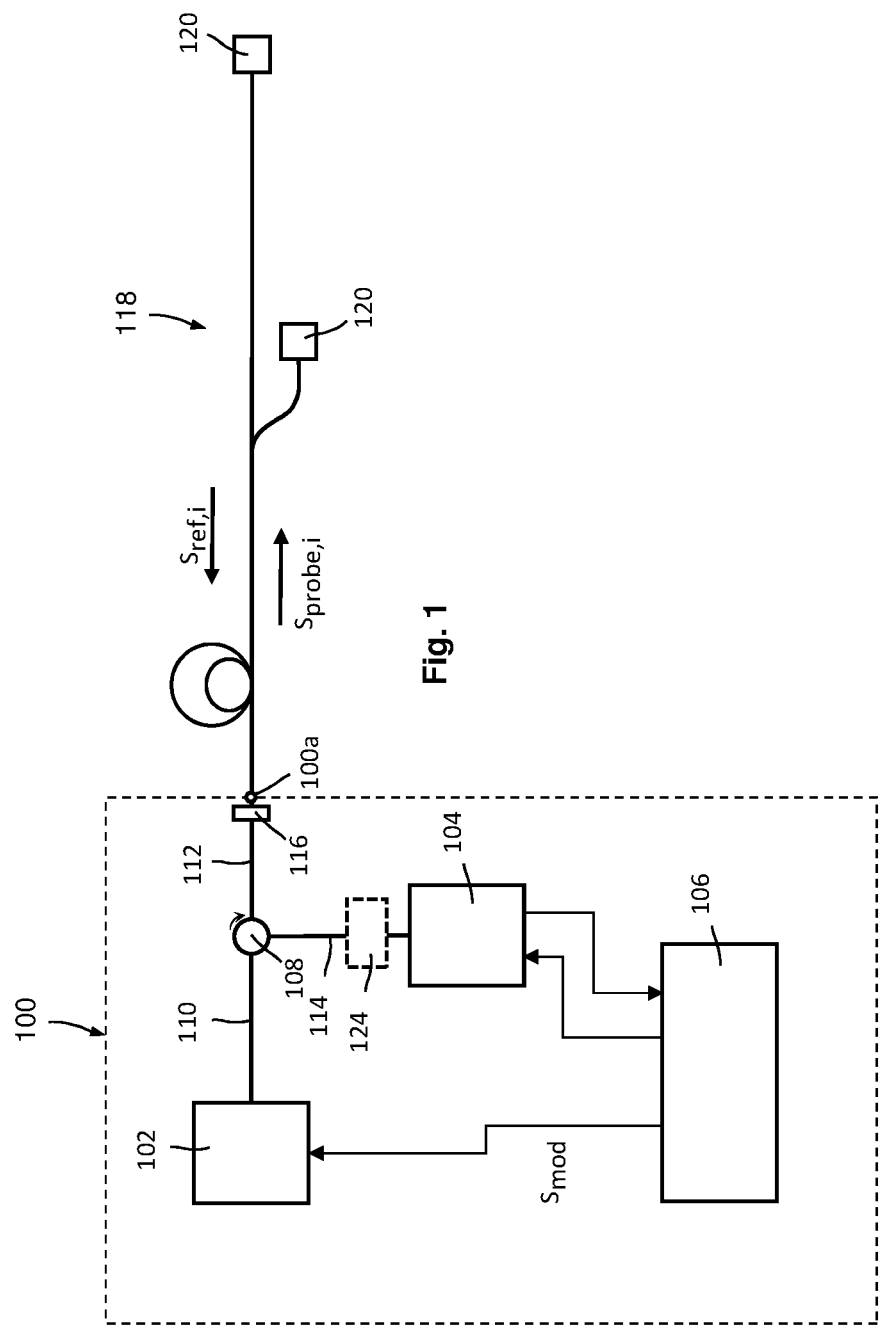
FIG. 1 shows a schematic block diagram of an OTDR device according to an embodiment of the invention which is coupled to an optical path comprising two optical sensors.

In the following, various embodiments of the invention will be described in detail with reference to the drawings. FIG. 1 shows a device 100 for interrogating at least one optical sensor comprising an optical transmitter 102, an optical receiver 104 and a control device 106. Generally, these components are configured to realize an OTDR system.

The optical transmitter 102 is configured to create at least two types of optical probe signals $S_{probe,i}$ at different optical frequencies $f_{opt,i}$, wherein the index i (i=1, 2, ...) designates the types of optical probe signals and the respective optical frequencies. Of course, in practice, the optical probe signals $S_{probe,i}$ cover a predetermined optical spectrum having a narrow bandwidth of e.g. several MHz to several hundred MHz, wherein the respective spectrum is characterized by a corresponding optical center frequency. Throughout this description, the term "optical frequency" of an optical source designates the respective center frequency.

The optical transmitter is connected via an optical path 110 to an optical circulator 108, which forwards the optical probe signals $S_{probe,i}$ via a further optical path 112 to a connection port 100a of the device 100. The optical circulator 108 separates the transmitting path and the receiving path within the device 100. Instead of an optical circulator any other appropriate optical means may be used which is capable of separating the transmitting and receiving path, e.g. an optical 1×2 coupler, which is configured to branch off a predetermined optical power portion of the reflection signals, in combination with an optical isolator, which suppresses the remaining power portion of the reflection signals that is fed in direction to the optical sources (e.g. lasers). However, the disadvantage of this alternative as compared to an optical diplexer is the insertion loss of an optical coupler.

The optical receiver 104 is also connected to the optical circulator 108, wherein the optical circulator 108 forwards optical signals that are received at the connection port 100a to the optical receiver 104 via a further optical path 114. The optical receiver 104 is configured to detect the optical signals received and to create corresponding electrical signals. In all embodiments of the present invention, it is sufficient if the optical receiver 104 detects the optical power of the optical signals received so that the respective electrical signals (especially the signal voltage) correspond to the optical power of the corresponding optical signals received. The electrical signals are fed to the control device 106, either as analog electrical signals or in the form of digital signals.

The control device 106 is configured to process the electrical signals according to the various embodiments described below. Further, the control device 106 may also be configured to control the optical receiver, e.g. with respect to the sensitivity or with respect to the time interval in which an electrical signal shall be created. The latter capability may for example be used to realize "windowing" for the signals received, i.e. to predetermine a time interval in which an electrical signal is created, wherein the start time of the interval is delayed versus the time at which an optical probe signal is created. This reduces the effort for detecting and analyzing the signals received.

Further, the control device 106 is configured to control the optical transmitter 102, e.g. with respect to points in time at which optical probe signals $S_{probe,I}$ are to be created and fed to the optical connection port 100a. Additionally, the control device 106 may be configured to create predetermined pulse sequences that are fed to the optical transmitter, wherein these pulse sequences are transformed into a modulating signal $S_{mod}$ (that may comprise two or more modulating signal components) by the optical transmitter 102 as described below.

The optical device 100 further comprises a reference reflector 116 which is provided within the optical path 112, e.g. close to the connection port 100a. Positioning the reference reflector 116 in close proximity to the connection port 100a has the advantage that the round-trip delay between the reference reflector 116 and a reflective position within an optical path connected to the connection port 100a and thus the length of the optical path between the reference reflector 116 and the reflective position can be determined with high accuracy.

It shall be mentioned at this point that the detailed design and functionality of the optical transmitter 102, the optical receiver 104 and the control device 106 with respect to the general functionality of creating optical signals and receiving optical signals is well known to a person skilled in the art and thus does not need further detailed description.

As shown in FIG. 1, the device 100 is configured to be connected to an optical path 118, e.g. an optical fiber. In the embodiment shown, two optical sensors 120 are connected to the optical path 118. It is also possible to provide an optical sensor 120 within the optical path, depending on its reflection spectrum as explained below.

If only one optical sensor 120 shall be interrogated by the device 100, the optical sensor may be connected to a far end of the optical path 118, wherein the optical path establishes a direct optical connection between the connection port 100a and the far end (i.e. without any branch). The optical sensors 120 are reflection-type sensors, i.e. they reveal a predetermined optical spectrum in which optical signals fed in the direction to such an optical sensor are at least partially reflected. The reflection spectrum generally reveals a predetermined spectral width and form. In many cases, the reflection spectrum has a predetermined maximum of the reflectivity, e.g. at a center wavelength of the reflection spectrum. Suitable sensors may for example be sensors that are based on a Bragg grating, for example a fiber Bragg grating (FBG). This sensor type reveals a periodical filter function, i.e. the reflection spectrum has periodical maxima. The width of the sections of the reflection spectrum in which reflection occurs may be very narrow, e.g. a few GHz only or even less.

If an optical sensor has such a periodical reflection spectrum, one of the maxima including a neighboring range can be used to interrogate the sensor. For simplicity, throughout this description, such a selected section of the whole reflection spectrum of the sensor is also referred to as "reflection spectrum".

As the device 100 comprises an optical transmitter 102 that is capable of creating optical probe signals at differing optical frequencies, it is possible to provide such optical sensors within an optical path. In this case, it must be guaranteed that the optical probe signals for interrogating a downstream optical sensor 120 that is positioned downstream an upstream optical sensor 120 are at least partially transmitted at any rate by the upstream optical sensor, irrespective of its state (especially the value of the parameter to be sensed). Partially reflecting/transmitting the optical probe signals by an optical sensor 102 makes it possible to cascade optical sensors and to interrogate the cascaded optical sensors using the same (or separate) optical probe signals having identical optical frequencies.

However, if each optical sensor is connected to the optical path 118 either at its far end or by means of a branch, the same set of optical probe signals may be used to interrogate each of the sensors 120. Such branches may be realized by optical couplers 122 which are configured to branch off a predetermined optical power portion of the optical probe signals guided in the downstream direction.

As mentioned above, the device 100 for interrogating the at least one optical sensor 120 in general performs the transmitting and receiving functionality of an OTDR device as known in the art. As described below, conventional OTDR devices using single pulses or correlation OTDR devices using pulse sequences as optical probe signals may be used.

However, in order to avoid the necessity of a spectral analysis in the optical receiver 104, the invention uses an optical transmitter 102 that creates at least two optical probe signals having differing optical frequencies. Of course, each optical frequency must lie within the spectral range defined by the optical sensor 120 to be interrogated including the shift of the reflection spectrum depending on the physical parameters to be sensed, e.g. temperature pressure, humidity etc.

According to the present invention, the spectral analysis in the optical receiver 104 is avoided by creating a time shift between the at least two optical probe signals $S_{probe,I}$ that reveal differing optical frequencies $f_{opt,I}$ and assigning the correct optical frequency to each optical reflection signal received using the information concerning the time shift relation between the optical probe signals. In addition, the known round-trip delay of an optical signal to and from a given optical sensor 120 may be used, especially in cases in which more than one optical sensor 120 is connected to or provided within the optical path 118.

If, for example, only a single optical sensor 120 is connected to the connection port 100a, and two optical probe signals $S_{probe,1}$ and $S_{probe,2}$ at optical frequencies $f_{opt,1}$ and $f_{opt,2}$ are used by the device 100, wherein the probe signals are time-shifted by $\Delta t$, only two reflection signals should be detected by the optical receiver 104 and the control device 106.

As the round-trip delays of the optical probe signals $S_{probe,1}$ and $S_{probe2}$ are essentially identical (the influence of dispersion, especially the chromatic dispersion can usually be neglected in at least short optical paths), it is possible to assign the optical frequency $f_{opt,1}$ to the first reflection signal received and the optical frequency $f_{opt,2}$ to the second reflection signal received. If, additionally, the round-trip delay of the signals is known, this information can be used to guarantee that the reflection signals are created by the corresponding optical sensor and not by any other component that creates reflections.

Figure 2:
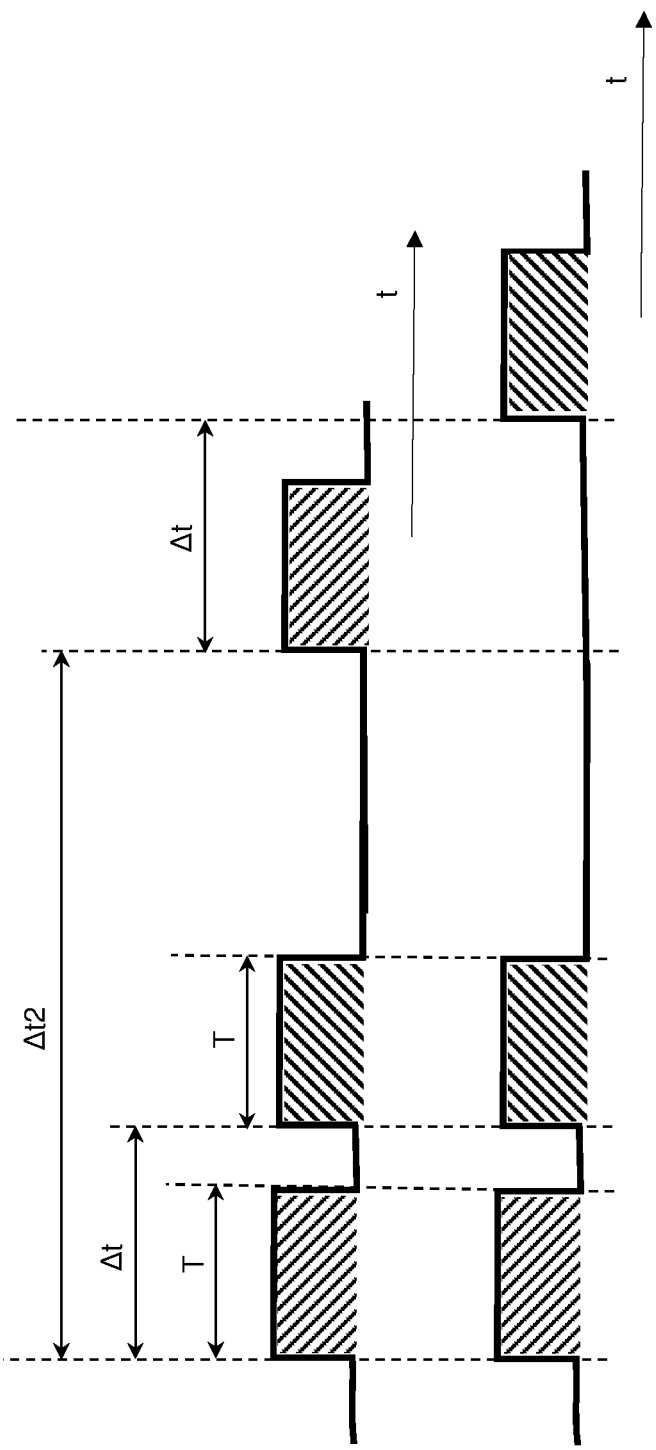
FIGS. 2(a)-(b) shows two schematic diagrams visualizing optical reflection signals created by a reference reflector and an optical sensor in an embodiment in which two optical probe signals at differing optical frequencies in the form of single optical pulses are used, wherein FIG. 2(a) visualizes the case when the first optical probe signal lies within the reflection spectrum of the sensor and FIG. 2(b) visualizes the case when the second optical probe signal lies within the reflection spectrum of the sensor.

Such an embodiment underlies the pulse diagrams shown in FIGS. 2(a)-(b). Two optical probe signals in the form of square pulses are created and fed to the optical path 118. The pulse width is T. As a result, two reflection signals are created by the reference reflector 116. As the optical probe signals $S_{probe,1}$ and $S_{probe2}$ have been created with a time shift Δt, the reference reflections that are detected by the optical receiver 104 and the control device 106 reveal the same time shift Δt. The reflection signal detected first has of course been created by the first optical probe signal $S_{probe,1}$ and therefore has the optical frequency $f_{opr,1}$. Likewise, the second reflection signal detected has been created by the second optical probe signal $S_{probe,2}$ and therefore has the optical frequency $f_{opr,2}$.

FIG. 2(a) shows that the state of the optical sensor 120 has caused a shift of the reflection spectrum in such a way that only the first optical probe signal $S_{probe,1}$ is reflected, whereas the second optical probe signal $S_{probe,2}$ is transmitted by the optical sensor. Thus, if the control device 106 knows the round-trip delay of the optical probe signals, it is possible to assign the optical frequency $f_{opr,1}$ to the third reflection signal detected by the optical receiver 104. FIG. 2(b) shows another extreme state of the optical sensor 120, in which a shift of the reflection spectrum has been caused in such a way that only the second optical probe signal $S_{probe,2}$ is reflected, whereas the first optical probe signal $S_{probe,1}$ is transmitted by the optical sensor. Thus, the control device 106 assigns the optical frequency $f_{opr,2}$ to the third reflection signal detected by the optical receiver 104.

In such an embodiment, in which one of the optical probe signals is not reflected by the optical sensor 120, it is necessary that the control device 106 knows the round-trip delay of the optical probe signals. In another embodiment, in which both or all optical probe signals are reflected in any state of the optical sensor 120, the knowledge of the time shift relation between the optical probe signals is sufficient in order to correctly assign the optical frequencies to the reflection signals received, at least if it can be guaranteed that the optical signals do not overtake each other when traveling along the optical path. However, this can easily be granted by fully compensating or at least reducing dispersion effects within the optical path or by using only sufficiently short optical paths in which the chromatic dispersion is sufficiently low or by using sufficiently large time shift Δt. In such an embodiment, the optical frequency $f_{opr,1}$ of the first optical probe signal $S_{probe,1}$ is assigned to the first reflection signal (apart from the reflections from the reference reflector 118, if such a reference reflector is present), the optical frequency $f_{opr,2}$ of the first optical probe signal $S_{probe,1}$ is assigned to the second reflection signal etc.

If more than one optical sensor 120 is used, the principle explained above can be deployed correspondingly. In this case, the maximum time shift between the first and the last optical probe signal must be smaller than the minimum round-trip delay of the optical signals between two neighboring sensors (more precisely, than the minimum difference of the round-trip delays of the optical signals to and from each of the sensors). Thus, the minimum admissible length (difference) Δl of the optical path between two neighboring optical sensors 120 can be calculated as $$\Delta l_{min} > v_g(f) \cdot \frac{\Delta t_{max}}{2} \tag{1}$$

wherein $\Delta t_{max}$ is the maximum time shift between the first (earliest) and last optical probe signal (in case of the above embodiment with two optical probe signals $\Delta t_{max} = \Delta t$) and $v_g(f)$ is the group velocity of the optical signals (as a function of the optical frequency, where this dependency may in most cases be neglected).

Figure 3:
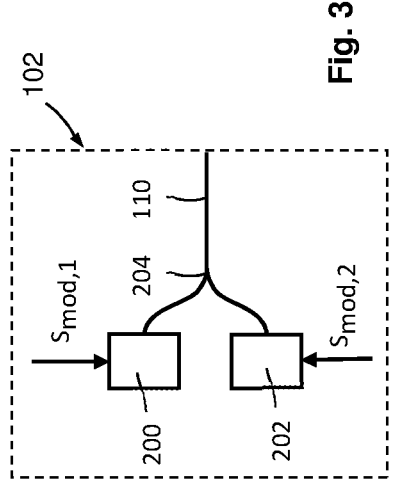
FIG. 3 shows a first embodiment of an optical transmitter comprised by the OTDR device in FIG. 1 comprising two optical narrowband sources at differing optical frequencies.

FIG. 3 shows a schematic block diagram of an embodiment of an optical transmitter 102 which is configured to create two optical probe signals $S_{probe,1}$ and $S_{probe,2}$ at two differing optical frequencies $f_{opt,1}$ and $f_{opt,2}$, respectively. This embodiment of an optical transmitter 102 comprises two separate narrow-band optical sources 200 and 202, e.g. lasers, wherein each optical source creates an optical carrier signal that is modulated by a respective modulating signal component $S_{mod,1}$ and $S_{mod,2}$, respectively (note that in this embodiment the modulating signal components, which may in general be regarded as components of a combined modulating signal $S_{mod}$, are separately fed to the respective optical sources). The optical probe signals created in this way are fed to the optical path 110 by an optical combiner 204, e.g. an optical 2×1 coupler, and both optical probe signals, which, as the case may be, overlap, are guided in direction to the connection port of the device 100. The modulating signals $S_{mod,1}$ and $S_{mod,2}$ may be created by the optical transmitter 102 itself, and a respective start signal that comprises the time information concerning the optical probe signals (e.g. a start time of the first optical probe signal, if the control device already knows the predetermined time shift between the probe signals, or the start times of each optical probe signal) is fed to the control device 106. Alternatively, the control device may create the modulating signals and feed these signals to the optical transmitter 102. Of course, these alternatives apply to all possible realizations of an optical transmitter.

This embodiment of an optical transmitter 102 can be used in connection with all known OTDR methods including methods in which the interrogation is performed by using single short optical pulses.

If a correlation OTDR method is used, that is if instead of single optical pulses two or more optical probe signals in the form of shifted pulse sequences are used to interrogate the at least one optical sensor, a single optical modulator may be used that modulates a single optical carrier at a single optical frequency for creating the time-shifted two or more optical probe signals at different optical frequencies. In order to achieve this, a modulating signal $S_{mod}$ (that may comprise an in-phase or I-component and a quadrature- or Q-component if an IQ-modulator is used as described below) is created by using, for each optical probe signal, a pulse sequence that is suitable for realizing a correlation OTDR method (e.g. a Golay sequence or complementary Golay sequences), wherein the pulse sequences are time-shifted in an appropriate manner, e.g. by 4 bits (at least by one bit). The first pulse sequence may be used as is or may be multiplied with a plus-minus (+/−) sequence having a constant or varying period, which or the average of which is large (at least by a factor 10, preferably by 20 to 100) as compared to the frequency difference(s) of the two or more optical probe signals. In this way, also this signal component of the modulating signal is made bias-free. Due to the long (average) period of this (+/−)-bit sequence, a corresponding frequency shift (which of course exists) is very small as compared to the frequency shift of the optical probe signals and does not influence the measurement result. Each of the other (second shifted and each further shifted) pulse sequences is multiplied by a linear phase pattern, i.e. a linear increase in the phase φ(t) as a function of time t. This leads to a corresponding frequency offset (versus the optical carrier frequency) Δf in the frequency domain of the optical probe signal which is created due to the time-shifted component of the optical modulating signal. If, for example, only two optical probe signals are to be created in this way, the combined modulating signal $S_{mod}$ may be written as $$S_{probe}(t) = \sum_{m=-\infty}^{m=+\infty} b(m) \cdot p(t - mT) \cdot P + b(m - n) \cdot \exp[+j \cdot (m - n)\Delta\varphi] \cdot p(t - mT) \quad (2)$$

wherein p(t) designates the pulse shape, b(m) is the (here binary) pulse sequence (i.e. b(m)=1 for all integer numbers m representing "1" bits and b(m)=0 for all integer numbers m representing "0" bits). The first summand on the right side of this equation is the unshifted pulse sequence and the second summand is the shifted pulse sequence with the constantly increasing phase. The constant integer number n designates the time shift by an integer multiple of the bit duration. As already explained above in general, the constant increase in the phase of the second pulse sequence leads to a corresponding frequency shift Δf in the frequency domain, which can be calculated as $$\Delta f = \frac{\Delta\varphi}{2\pi T} \quad (3)$$

wherein T designates the bit duration. If, for example, the phase difference Δφ is π/2, the frequency offset Δf is 1/(4T), i.e. corresponds to one fourth of the bit rate BR (wherein BR=1/T). The parameter P in equation (2) is a complex (constant) parameter that modifies the complex amplitude of the first (unshifted) optical probe signal as compared to the second (time-shifted) optical probe signal. Of course, in general, also the second optical probe signal may comprise such a (further) complex amplitude (for simplicity, in equation (2) the further complex amplitude has been omitted, i.e. the amplitudes of the two summands have been normalized in such a way that the amplitude of the second optical probe signal is 1 or at least real (if the pulse shape function p(t) is real but reveals a maximum that is not equal to 1).

Figure 4:
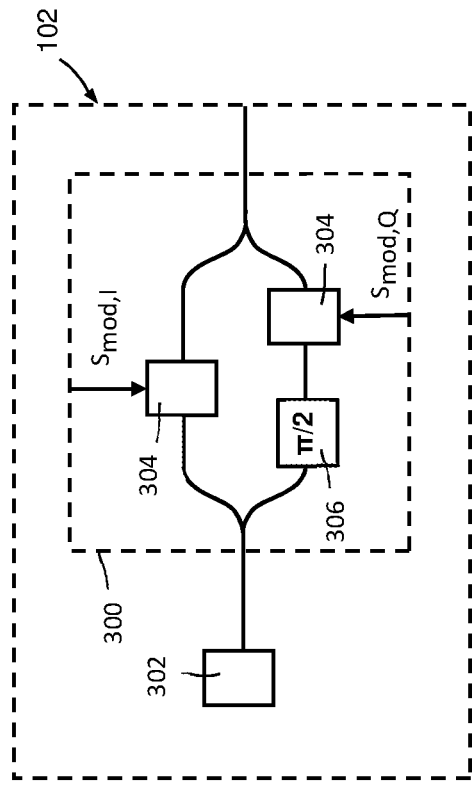
FIG. 4 shows a second embodiment of an optical transmitter comprised by the OTDR device in FIG. 1 comprising an IQ-modulator.

According to a first alternative, in which a single optical source creates a single optical carrier to be modulated, an optical IQ-modulator as shown in FIG. 4 may be used. In this case, the real part of equation (2) may be used as an in-phase modulating signal component $S_{mod,I}$ and the imaginary part as a quadrature modulating signal component $S_{mod,Q}$. The optical transmitter 102 according to FIG. 4 comprises an IQ-modulator 300 (comprising a modulator or mixer 304 in each arm configured to receive the respective modulating signal component $S_{mod,I}$, $S_{mod,I}$, and a phase shifter 306 introducing a phase shift of π/2 in one arm) and a single narrow-band optical source 302, e.g. a laser, connected to the IQ-Modulator 300. As the structure/design of an IQ-modulator is well known in the art, a further detailed description in this regard may be omitted.

Figure 5:
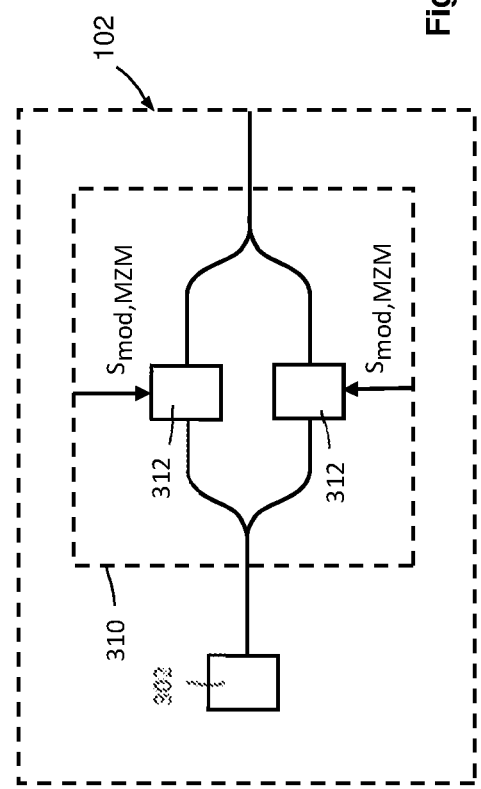
FIG. 5 shows a third embodiment of an optical transmitter comprised by the OTDR device in FIG. 1 comprising a Mach-Zehnder-modulator.

A further reduction of the modulator and thus the optical transmitter 102 complexity can be achieved if, instead of an IQ-modulator, a Mach-Zehnder-Modulator (MZM) 310 may be used as shown in FIG. 5. The MZM is realized as a dual-drive MZM, having a controllable optical phase-shifter 312 in each arm. The MZM is preferably operated in the push-pull mode. As also the structure/design of an MZM-modulator is well known in the art, a further detailed description in this regard may be omitted.

FIG. 6 shows, by way of a specific example, how the modulating signal for an MZM can be created using a predetermined pulse sequence. As already mentioned, the modulating signal may (in case of all types of an optical transmitter) be created by (within) the optical transmitter 102 or the controller device 106. The pulse sequence may, for example, be a 2048 bit Golay sequence. Line (A) of the table shown in FIG. 6 comprises the pulse sequence, which is used to create the respective probe signal and also the cross-correlation when carrying out the signal detection. Line (B) shows the shifted bit sequence included in the first line of the table, wherein the time shift is 4 bit in the example shown. Line (C) shows the pulse sequence in line (A) multiplied with a (+/−)-sequence of a period of 20 bits (i.e. the first 10 bits of a period are +1 and the second 10 bits are −1). This period of 20 bits is used as an example and for demonstration purposes only. Preferably, the period should be lager, e.g. 80 or larger or even 100 or lager in order to avoid spectral components which are too close to the desired (shifted) frequency of the optical carrier to be modulated. As already mentioned, this operation makes the respective resulting bit sequence bias-free. Line (D) includes a bit sequence which is created by multiplying the shifted bit sequence in line (B) with a (+/−)-sequence having a period of 2. That is, this modulation of the shifted bit sequence creates frequency shift of plus and minus half the bit rate of the spectrum of the shifted bit sequence. Finally, line (E) includes the sum of the bit sequences in lines (C) and (D), which is used as the respective modulating signal $S_{mod,MZM}$ in a device 100 comprising an optical transmitter according to FIG. 5.

FIG. 7 shows a diagram with a curve representing the optical power of two (superimposed) optical probe signals created with a combined modulating signal $S_{mod,MZM}$ according to line (E) of the table in FIG. 6, wherein the optical power has been normalized to a maximum value of 1. It is to be mentioned that the optical power of the (superimposed) probe signals is identical at bit positions having values of $\pm v_a$, wherein $v_a$ is the value of the modulating signal $S_{mod,MZM}$ at the respective bit positions.

FIG. 8 shows the optical spectrum of the optical probe signals according to FIG. 7, wherein the x-axis is the deviation relative to the optical carrier frequency $f_{opt}$. The two peaks symmetrical to 0 are created by the unshifted pulse sequence multiplied by the (+/−)-sequence having a period of 20. As explained, if this period is made larger, the frequency shift of these components becomes smaller, so that the frequency distance between the two shifted probe signals becomes larger. The two further peaks at ±0.5 are created by the modulated shifted pulse sequence. As mentioned, these peaks are created at distances of ±0.5 times the bit rate from the carrier frequency $f_{opt}$.

It shall be mentioned that more equal peaks of the spectra of the two optical probe signals can be achieved by multiplying the pulse sequences in lines (C) and (D) of the table in FIG. 6 with appropriate (constant) factors, e.g. by multiplying the sequence in line (D) by 1.4 before adding the two sequences in lines (C) and (E).

The interrogation of the one or more optical sensors can therefore be performed at essentially the frequencies of the two optical probe signals, i.e. the unshifted signal that comprises the two center peaks that are close to the carrier frequency $f_{opt}$ and the shifted signal that comprises the two peaks at ±0.5 (i.e. the carrier frequency $f_{opt}$ plus and minus half the bit rate).

FIGS. 12(a)-(d) shows correlation results obtained with the optical probe signals according to the embodiment explained above with reference to FIGS. 5 to 8. The curves in the diagrams comprised by FIGS. 12(a)-(d) are simulation results obtained using two 2048 bit complementary Golay sequences Golay A and Golay B. The method explained above has been performed using at first the Golay A sequence and in a further step the Golay B sequence, and then the correlation functions have been added, i.e. averaged. This leads to a reduction of leading and trailing extrema of the averaged correlation function. The time shift applied to each (unshifted) Golay A and B sequence in order to create the time-shifted optical probe signal was 4 bit. The bit rate was 10 Gbit/s, i.e. the frequency shift of the time-shifted optical probe signal equals 5 GHz. The optical sensor used for this simulation has a Gaussian filter curve having a bandwidth of 4.6 GHz.

The x-axis in FIGS. 12(a)-(d) is a time axis and the y-axis represents the (relative) value of the (averaged) correlation function. The diagrams (a), (b), (c) and (d) show the results in cases in which the center frequency of the filter reflection spectrum was shifted versus the optical carrier frequency (i.e. essentially the optical frequency of the unshifted optical probe signal) by −5 Ghz, 0 GHz, +5 GHz and +6 Ghz.

The two grey bands in FIGS. 12(a)-(d) designate the areas in which the correlation functions have their peaks (at the two time-shifted positions corresponding to the time-shifted optical reflection signals) if a reflection signal is actually created (depending on the frequency shift of the filter reflection spectrum of the optical sensor). The left grey band designates the time area in which the peak of the correlation functions lies caused by an optical reflection signal that is (as the case may be) created by the unshifted optical probe signal at the unshifted frequency. The right grey band designates the time area in which the peak of the correlation functions lies caused by an optical reflection signal that is (as the case may be) created by the time-shifted optical probe signal at the shifted frequency.

As apparent from FIGS. 12(a)-(d), the maximum correlation peak that results from an optical reflection signal caused by the non time-shifted optical probe signal (at essentially the optical carrier frequency) is at a maximum if the center frequency of the reflection spectrum is equal to the optical carrier frequency. In this case, only a small reflection is created by the second time-shifted optical probe signal (at frequencies $f_{opt} \pm 5$ GHz). This situation is shown by the curve in FIG. 12(b). There is a high first peak (within the left grey band) and only a small negative second peak (within the right grey band).

Figure 12A:
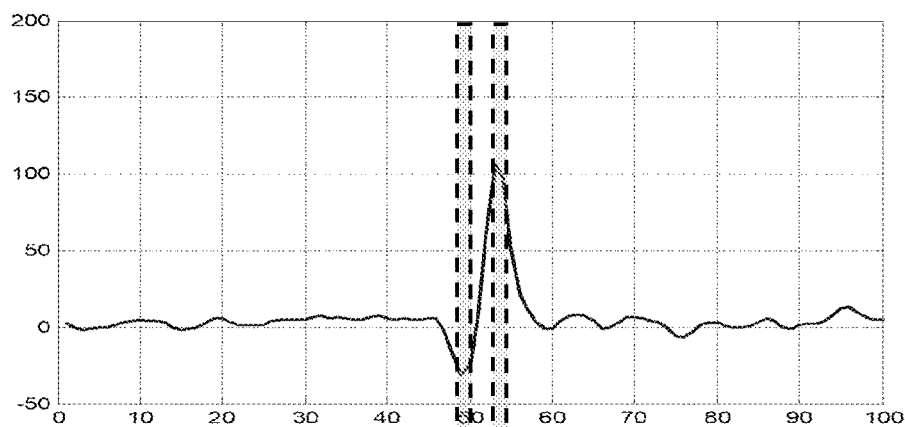
FIGS. 12(a)-(d) shows four diagrams comprising values of a correlation of two optical probe signals in case of the embodiment according to FIGS. 6 to 8, wherein the various diagrams show different shifts of the reflection spectrum of the optical sensor versus the optical frequencies of the optical probe or reflection signals.
Figure 12B:
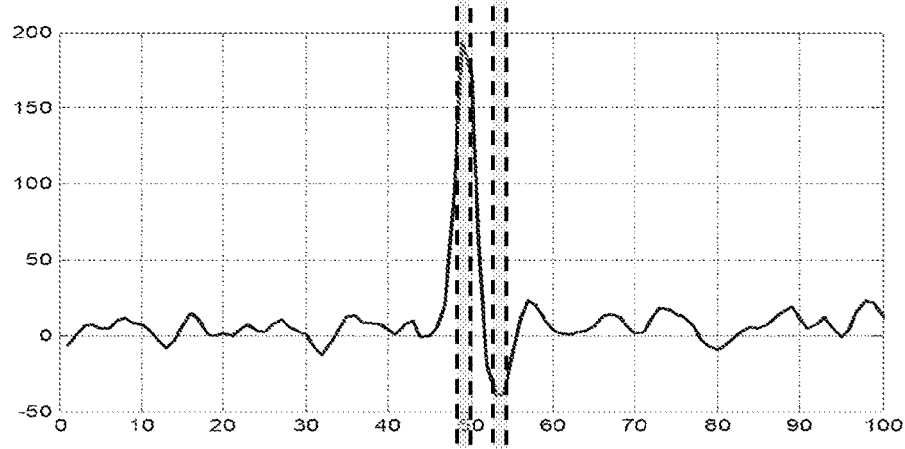
Figure 12C:
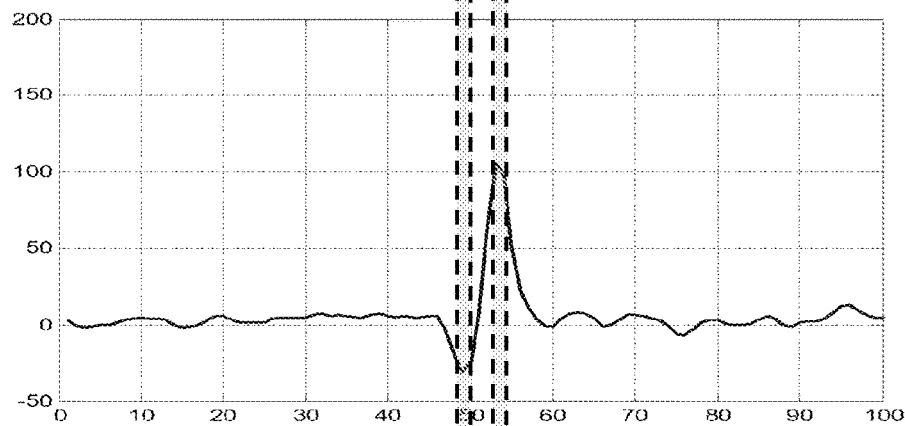
Figure 12D:
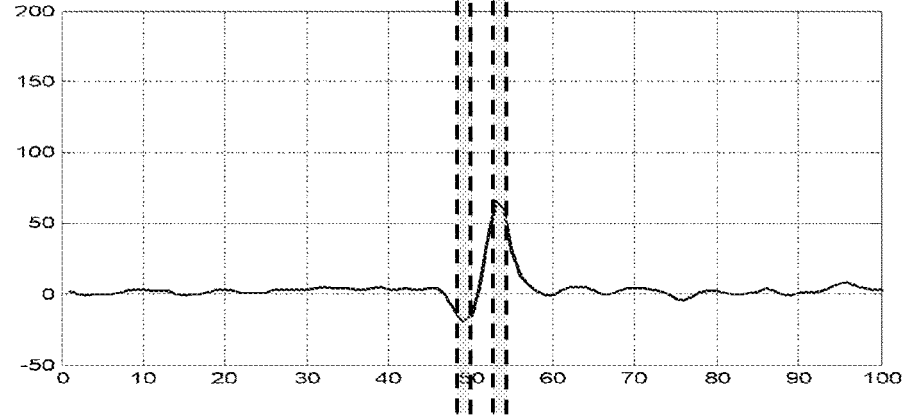

If the frequency shift of the sensor reflection spectrum versus the optical carrier frequency is +5 Ghz (FIG. 12(c)) or −5 Ghz (FIG. 12(a)), there is only a small peak at the first time position (within the left grey band) and a higher peak at the second time position (within the right grey band). This results from the fact that the MZM creates both side bands (at $f_{opt} \pm BR$) when the time-shifted bit sequence that has been multiplied with the (+/−)-sequence of a period of 2 bits is used as a modulating signal component.

If the frequency shift of the sensor reflection spectrum versus the optical carrier frequency $f_{opt}$ is +6 Ghz (FIG. 12(c)), an even smaller peak of the correlation functions at the second time position (i.e. within the right grey band) is observed.

The shift of the sensor reflection spectrum (which is caused by the physical parameter to be detected) versus the optical carrier frequency (or any other reference frequency) or the absolute position thereof may therefore be determined from the information comprising the presence of the reflection signals and/or the amplitude of the correlation function which is a measure of the optical energy of the optical reflection signals.

FIG. 9 shows, by way of a specific example, how the modulating signal (better modulating signal components) for an IQ-modulator can be created using a predetermined pulse sequence. As in the previous case of an MZM, lines (A) and (B) of the table in FIG. 9 show the non time-shifted and the time-shifted pulse sequence (which may be of the same type as mentioned above). Line (C) again includes the pulse sequence in line (A) that has been made bias-free by multiplying it with a (+/−)-period of 20 (for simplicity as a higher period would require an even larger table). As in the above case, the period should be larger, e.g. 100 or more. It shall be mentioned that this period does not need to be constant but may change over the time (even the half periods of periods of different lengths may be mixed). However, in the average (over a predetermined longer time interval), the sequence should be bias-free, i.e. the averaged signal amplitude should be zero. Lines (D) and (E) of the table include the shifted pulse sequence of line (B) multiplied with a cosine and sine of a period of 4, i.e. a period of the sequence for the multiplication is [1, 0, −1, 0] for the cosine and [0, 1, 0, −1] for the sine. The grey cells in lines (D) and (E) are the cells in which the afore-mentioned cosine and sine periods begin.

Line (F) includes the sum of the sequences in lines (C) and line (D), and line (G) includes the sum of the sequences in lines (C) and line (E). The sequences of lines (F) and (G) are used as modulating signal components for the IQ-modulator, i.e. as the in-phase modulating signal and the quadrature modulating signal, respectively. This corresponds to the explanations above, especially with respect to equation (2).

If the first summand in equation (2) is multiplied by the complex factor (1+j), which is equal to $$(\sqrt{2} \cdot e^{\frac{\pi}{4}}),$$

both optical probe signals created by these combined modulating signal components have the same optical power (or energy). It can be shown that in this case equation (2) can be written as $$S_{probe}(t) = X + jY, \qquad (4)$$

wherein $$X = \sum_{m=-\infty}^{m=+\infty} b(m) \cdot p(t - mT) + b(m - n) \cdot \cos[(m - n)\Delta\varphi] \cdot p(t - mT)$$

$$Y = \sum_{m=-\infty}^{m=+\infty} b(m) \cdot p(t - mT) + b(m - n) \cdot \sin[(m - n)\Delta\varphi] \cdot p(t - mT)$$

This equation corresponds to the method of creating the pulse sequences included in line (F) of the table in FIG. 9, which is the in-phase component of the modulating signal and in line (G), which is the quadrature component of the modulating signal, apart from the multiplication of the unshifted signal with the (+/−)-sequence in order to make this pulse sequence bias-free.

Figures 10, 11:
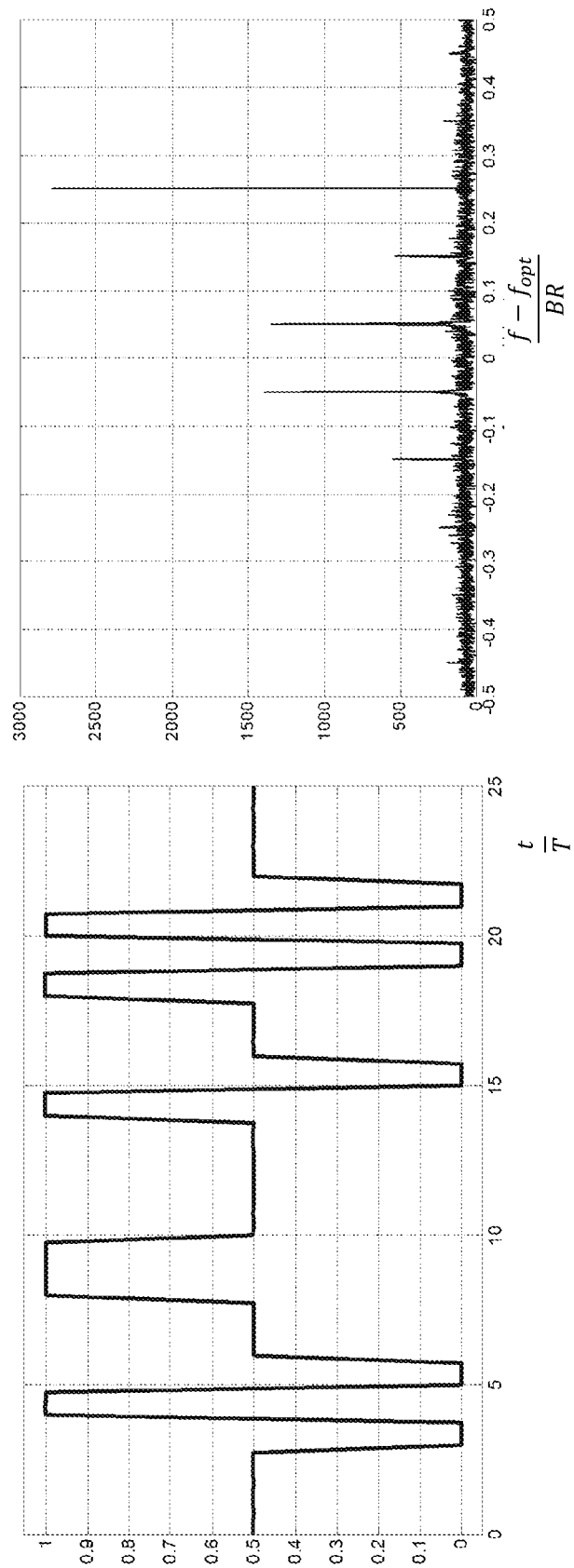
FIG. 10 shows a diagram that displays the ternary optical signal as a function of time that is created by overlapping the two optical probe signals created according to the pulse sequence example in FIG. 9.
FIG. 11 shows the optical spectrum of the optical probe signals according to FIG. 10.

FIG. 10 shows a diagram comprising a curve of the optical power of the overlapping optical probe signals created by feeding the modulating signal according to the table in FIG. 9 to an IQ-modulator 300, wherein the optical power has been normalized to a value of 1. FIG. 11 shows the optical spectrum of these overlapping optical probe signals. This spectrum is similar to the spectrum that is achieved by an MZM (see FIG. 8), however, the partial spectrum of the time-shifted optical probe signal comprises only one peak at $$\frac{f - f_{opt}}{BR} = 0.5$$

i.e. the left side band is suppressed. This facilitates the evaluation of the optical reflection signals in order to determine the information regarding the physical parameter to be detected.

In the following, it will be described how the desired information of the physical parameter can be obtained. It shall be mentioned that the evaluation of the presence or amplitude of the reflection signals is independent of the manner in which the detection of the reflection signals is performed, e.g. using a correlation OTDR method or any other OTDR method (e.g. using single pulses having sufficient optical power or energy).

As already briefly mentioned, the respective optical sensor can be used as a threshold detector. For example, in a fundamental state of the sensor, the parameter may lie within a range that causes the reflection spectrum to be within a range of (admissible) shifts in which only one of two optical probe signals is reflected. If the physical parameter leaves this range, also (or only) the second optical probe signal is at least partially reflected. This second state may be an inadmissible state and, for example, a warning signal may be created. Of course, the shape and especially the width of the reflection spectrum and the optical frequencies of the optical probe signals must be chosen in an appropriate manner.

It is also possible to evaluate the optical power or energy of the optical reflection signals and not only the presence thereof. In these cases, the physical parameter to be measured can be determined by (a) translating the amplitudes of the reflection signals into a respective frequency position of the sensor reflection spectrum (e.g. the deviation of the center frequency of the sensor reflection spectrum from the optical carrier frequency) and (b) translating the frequency position of the sensor reflection into a corresponding value of the measurement parameter.

Figure 13:
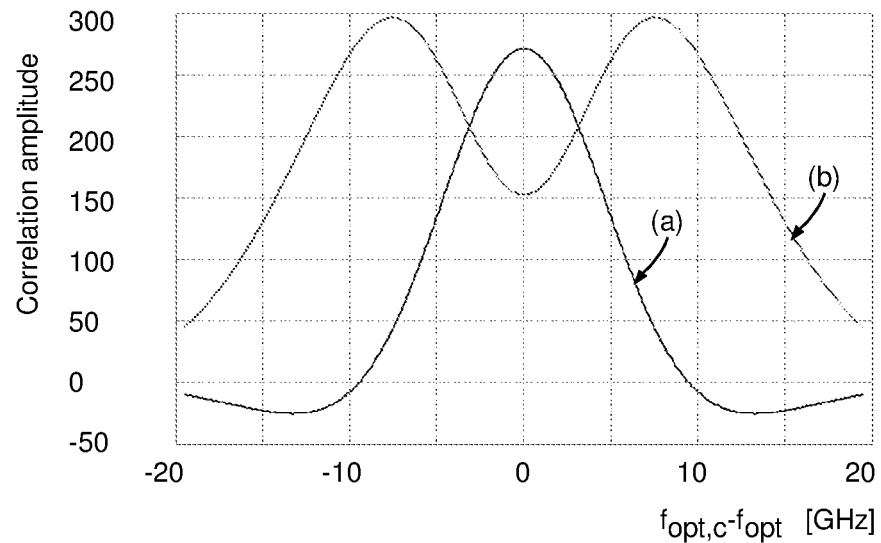
FIG. 13 shows a diagram comprising two curves, which are frequency dependencies of the correlation amplitude obtained for each of the optical reflection signals in the embodiment according to FIGS. 6 to 8 and 12(a)-(d)

FIG. 13 shows a diagram comprising curves of the correlation amplitudes obtained for the embodiment described above in which two optical probe signals are created using an MZM, i.e. both sidebands of the shifted optical probe signals are present (see FIG. 8). This Figure shows the dependency of the respective correlation amplitude on the shift of the sensor reflection spectrum versus the optical carrier frequency (which essentially corresponds to the optical frequency of the unshifted optical probe signal). These curves have been obtained by simulation using complementary 2048 bit Golay sequences (as explained above) at a data rate of 10 Gbit/s and a sensor having a Gaussian reflection spectrum with a bandwidth of 11.5 GHz. The respective two optical probe signals have been shifted by 4 bit, i.e. 400 ps.

Curve (a) shows the dependency of the correlation peak obtained for the unshifted optical reflection signal (the peak is of course detected at the respective time corresponding to the round-trip delay of the unshifted signal). As the partial optical spectrum of the signals is narrow (at least if only one of the sidebands is considered), curve (a) has essentially the Gaussian shape of the reflection spectrum.

Curve (b), which shows the behavior of the correlation amplitude of the shifted optical probe (and reflection) signal (obtained at the respective shifted time position), has two maxima due to the presence of both sidebands.

In order to translate these correlation amplitudes into a single parameter, a mathematical operation that links these two parameters can be used, for example simply calculating the ratio of the correlation amplitudes $C_1$ and $C_2$ obtained for the first (unshifted) optical reflection signal and the second (time-shifted) optical reflection signal, respectively. This is, however only possible if it can be guaranteed that the correlation amplitude $C_2$ does not assume a value of zero within the interesting range of the physical parameter to be measured. Such a ratio does not depend on the loss introduced by the optical path when the respective signals travel from the near end to the sensor position and back.

As the correlation amplitudes can be positive and negative, the mathematical operation shall create differing results for values of $C_1$ and $C_2$ having the same absolute values but differing signs.

As a possible ratio parameter RP that can be used to translate the correlation peaks into a frequency position or a shift of the sensor reflection spectrum, the angle of the complex number may be used that can be formed by the correlation amplitudes $C_1$, $C_2$ $$RP = \text{angle}(C_1 + j \cdot C_2) \tag{5}$$

The angle $RP_\varphi$ of this complex correlation ratio CRP can be written as $$RP_\varphi = \arctan\left(\frac{C_2}{C_1}\right) + \text{sign}(C_2) \cdot [1 - \text{sign}(C_1)] \cdot \frac{\pi}{2} \tag{6}$$

wherein sign(x) designates the signum function depending on a variable x. Equation (6) takes into account that the arctan function is defined only in ranges $$]-\pi/2; +\pi/2[ + k \cdot \pi$$

wherein k is a positive or negative integer number.

Figure 14:
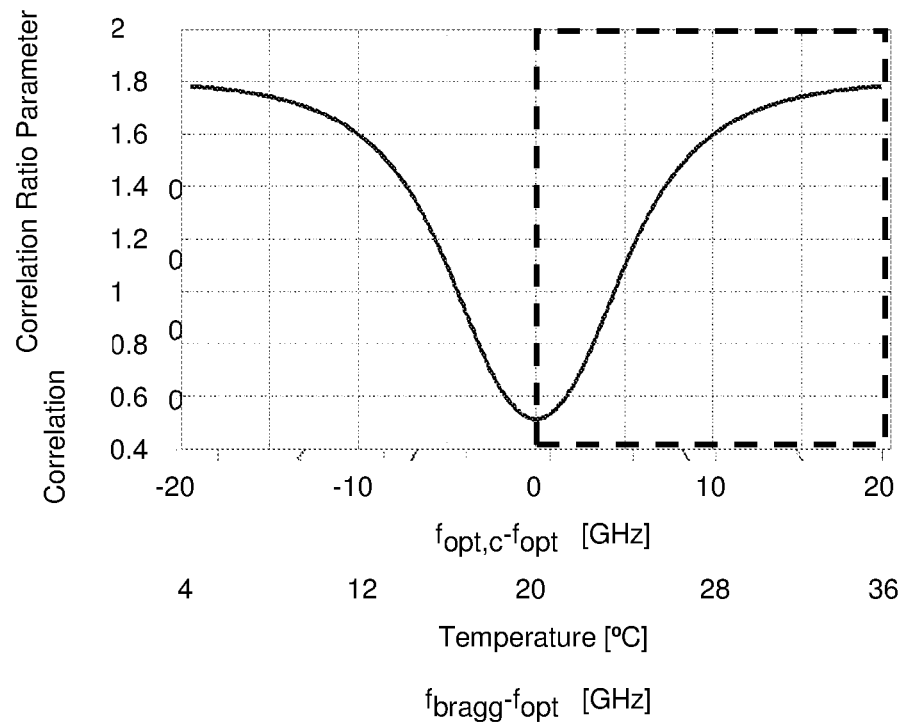
FIG. 14 shows a diagram comprising a curve of an angle ratio parameter $RP_\varphi$ depending on the frequency shift of the center frequency $f_{opt,c}$ of the reflection spectrum of an optical sensor versus the optical carrier frequency.

FIG. 14 shows the correlation parameter ratio angle $RP_\varphi$ for the embodiment underlying FIG. 13. As apparent from this Figure, $RP_\varphi$ is symmetrical to the vertical straight line ($f_{opt,c} - f_{opt}$), wherein $f_{opt,c}$ designates the center wavelength of the sensor reflection spectrum. That is, without using further information, only the left (negative) or right (positive) half of the range of the x-axis shown in FIG. 14 can be used for determining the frequency shift ($f_{opt,c} - f_{opt}$) from the correlation parameter ratio angle $RP_\varphi$ using a corresponding inverse dependency. By way of example, the dashed square in FIG. 14 designates the range to be used. The temperature scale added to the x-axis in FIG. 14 shows the translation of the frequency shift ($f_{opt,c} - f_{opt}$) into the parameter to be measured, here the temperature. Using the dashed uniqueness range of the dependency that translates the parameter ratio angle $RP_\varphi$ into the frequency shift ($f_{opt,c} - f_{opt}$), a temperature range of approximately 20 to 36° C. can be measured.

Of course, this method can also be applied if any other OTDR method is used in order to determine the amplitude of the optical reflection signals.

Figure 15:
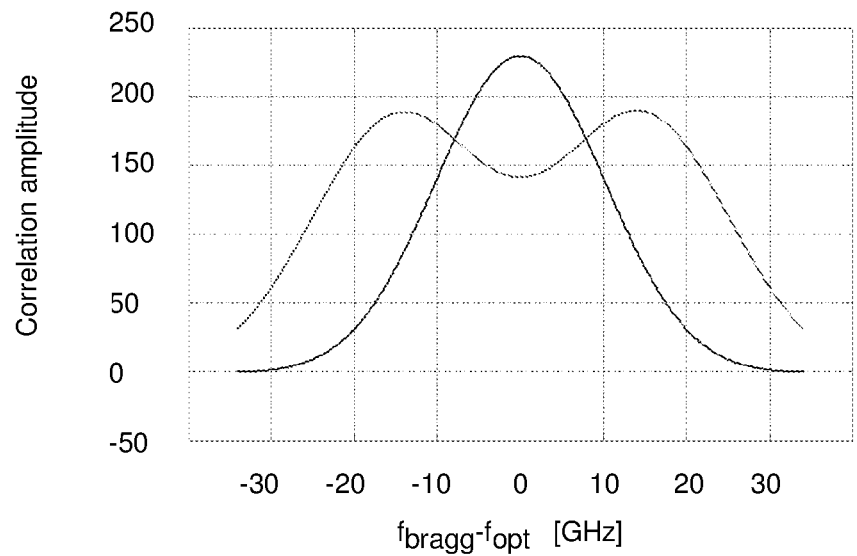
FIG. 15 shows a diagram corresponding to FIG. 13 in a corresponding embodiment, wherein a four-fold oversampling of the bit sequences underlying the optical probe signals is used.
Figure 16:
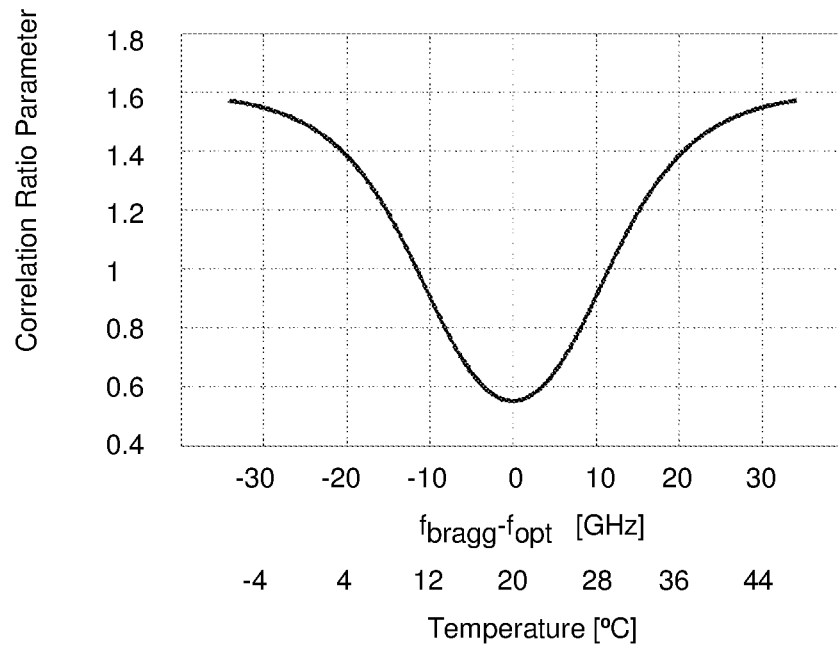
FIG. 16 shows a diagram corresponding to FIG. 14 in case of an oversampling according to FIG. 15.

FIGS. 15 and 16 show relationships corresponding to FIGS. 13 and 14, however, for an embodiment in which oversampling of the unshifted and shifted bit sequences has been used, i.e. one bit of the respective bit sequences is represented by 2 or more (identical) values. In the example shown, a 4-fold oversampling was used.

The Gaussian curve of the sensor reflection spectrum in this embodiment (the results have again been obtained by simulation) had a bandwidth of 23 GHz (double the bandwidth of the sensor reflection spectrum in FIG. 13). A (+/−) phase modulation of the time-shifted pulse sequence with a period of 2.4 samples (on average) has been used which leads to a frequency shift of the time-shifted optical probe signal of ±16.7 GHz (as an MZM is used for creating the optical probe signals). The curves in FIGS. 15 and 16 are similar to the curves in FIGS. 13 and 14, but differ in the x-axes scales.

It is thus to be noted that the method of oversampling makes it possible to increase the frequency shift of the respective optical probe signal. Oversampling the bit sequences may also be correspondingly used if the two or more optical probe signals are created by an IQ-modulator.

Finally, it shall be mentioned that the time shift between the optical probe and reflection signals may not be introduced in the optical transmitter 102 (FIG. 1). Rather, the optical probe signals may be created at the same time (i.e. the pulse sequences have the identical start time) and the time shift may be introduced by providing a chromatic dispersion generating component within the optical path guiding the optical probe signals or the optical reflection signals. As shown in a dashed representation, the chromatic dispersion generating component 124 may be provided in the optical path right before the optical receiver, i.e. within the device 100.

If an IQ-modulator is used for creating the optical probe signals, introducing the time shift is, however, much easier and creates less effort than additionally providing a chromatic dispersion generating component in the optical path.

Nevertheless, if an MZM is used that creates two images of the time-shifted optical probe signal (at the same time) at differing optical frequencies shifted by e.g. ±half the bit rate (if no oversampling and a (+/−) phase modulation with a period of 2 is used), a chromatic dispersion generating component can be used to time-shift these two images versus each other. According to the relation $$\Delta\tau(ps) = 8 \cdot 10^{-3} \cdot D\left(\frac{ps}{nm}\right) \cdot \Delta f(\text{GHz}) \quad (7)$$

a dispersion of D=2500 ps/nm would be required to shift the two sideband images of a 10 Gb/s signal (at frequencies of $f_{opt} \pm 5$ GHz) by two bit periods. If 4-fold oversampling is used, i.e. the frequency shift between the sidebands is 40 GHz instead of 10 GHz, a dispersion of 625 ps/nm would be required.

LIST OF REFERENCE SIGNS AND DESIGNATIONS OF PHYSICAL ENTITIES 100 device for interrogating at least one optical sensor
100a connection port
102 optical transmitter
104 optical receiver
106 control device
108 optical circulator
110 optical path
112 optical path
114 optical path
116 reference reflector
118 optical path
120 optical sensor
122 optical coupler
124 chromatic dispersion generating component
200 optical source
202 optical source
204 optical combiner
300 IQ-modulator
302 optical source
304 optical mixer/modulator
306 phase shifter
310 MZM
312 controllable phase shifter
BR bit rate
b(m) pulse sequence (integer index m)
p(t) pulse shape
P complex amplitude
$S_{probe,i}$ optical probe signal (index i=1, 2, ... )
$S_{ref,i}$ optical reflection signal (index i=1, 2, ... )
$S_{mod}$ modulating signal
$S_{mod,i}$ modulating signal component (index i=1, 2, ... )
$S_{mod,Q}$ modulating signal component (index i=1, 2, ... )
t time
$\Delta t$ time shift between first and second optical probe/reflection signal
$\Delta t_{max}$ maximum time shift between the first (earliest) and last optical probe signal
$\Delta l_{min}$ minimum admissible length (difference) $\Delta l$ of the optical path between two neighboring optical sensors
T bit duration
$v_g(f)$ group velocity
$f_{opt,i}$ optical frequency (index i=1, 2, ... )
φ phase
Δφ phase difference

The invention claimed is:

1. A method for interrogating at least one optical sensor that is provided within or connected to an optical path at a sensor position, the optical path connecting the optical sensor to a near end of the optical path, wherein the at least one optical sensor has a known frequency-dependent course of its reflectivity that is changed by a physical parameter to be sensed, especially the temperature or humidity of the environment surrounding the at least one optical sensor or the pressure being exerted onto the at least one optical sensor, the method comprising the steps of:
  (a) feeding at least two optical probe signals ($S_{probe,i}$) having differing optical center frequencies to the near end of the optical path,
    (i) wherein the at least two optical probe signals ($S_{probe,i}$) are time-shifted versus each other in a predetermined manner when being fed to the near end of the optical path, or
    (ii) wherein a predetermined time shift between the at least two optical probe signals ($S_{probe,i}$) or corresponding optical reflection signals ($S_{ref,i}$) is introduced within the optical path or within an optical receiver using a chromatic dispersion generating component);
  (b) detecting reflected optical power portions of the at least two probe signals (optical reflection signals ($S_{ref,i}$)) created by the at least one optical sensor depending on its frequency-dependent course of the reflectivity and the optical frequencies of the at least two optical probe signals ($S_{probe,i}$), assigning each optical reflection signal ($S_{ref,i}$) detected to one of the at least one optical sensor and assigning a correct optical frequency to each optical reflection signal ($S_{ref,i}$)

detected using a known round-trip delay of the at least two optical probe signals ($S_{probe,i}$) between the near end and the respective sensor position and/or using the time shift relation between the at least two optical probe signals ($S_{probe,i}$); and (c) determining an absolute value or a value range or a change of a value or value range of the parameter to be sensed using the presence of one or more of the following physical conditions:

the optical reflection signals ($S_{probe,i}$) or the maximum optical power or the optical energy thereof, the frequency-dependent course of the reflectivity of the at least one optical sensor and its dependency on the parameter to be sensed, and the optical frequency of each of the optical reflection signals ($S_{ref,i}$) detected, or using one or more dependencies that link these physical conditions.

2. The method according to claim 1, wherein in terms of their course over time apart from a given time shift, the at least two optical probe signals ($S_{probe,i}$) are identical.

3. The method according to claim 2, wherein the at least two optical probe signals ($S_{probe,i}$) are digital optical signals each comprising a predetermined number of bits having a given bit duration, that the optical reflection signals ($S_{ref,i}$) detected are correlated with a bit sequence that is identical to the optical probe signals ($S_{probe,i}$) in terms of the course over time and that amplitudes of correlation peaks determined are used in order to determine the absolute value or the value range or the change of the value or value range of the parameter to be sensed.

4. The method according to claim 3, wherein two or more optical probe signals ($S_{probe,i}$) are created by using a modulating signal ($S_{mod}$) comprising a first pulse sequence and at least one further pulse sequence, wherein each further pulse sequence is an image of the first pulse sequence that is time-shifted by a respective differing time shift of at least one bit and on which a respective differing constant phase slope is applied, and wherein the two or more pulse sequences may further differ by a complex amplification factor, and by using the modulating signal ($S_{mod}$) to optically modulate a single optical carrier signal having a predetermined optical frequency.

5. The method according to claim 4, wherein the complex amplification factor is chosen in such a way that the optical power portions comprised within the respective optical probe signals ($S_{probe,i}$) are essentially equal.

6. The method according to claim 4, wherein two optical probe signals ($S_{probe,i}$) are created by using IQ-modulation, (a) wherein an in-phase component of the modulating signal ($S_{mod}$), which is equal to the real part of a complex representation of the sum of a first and a second pulse sequence, is used as an in-phase modulating signal component ($S_{mod,I}$), and (b) wherein a quadrature component of the modulating signal ($S_{mod}$), which is equal to the real part of a complex representation of the sum of the first and second pulse sequence, is used as a quadrature modulating signal component ($S_{mod,Q}$).

7. The method according to claim 6, wherein (a) the in-phase modulating component ($S_{mod,I}$) of the modulating signal ($S_{mod}$) is created by using a binary bit sequence having a predetermined number of bits, wherein the binary bit sequence or a bias-free version of the binary bit sequence and a time-shifted image of the binary bit sequence that has been multiplied with a cosine of a given period are added, and (b) the quadrature component ($S_{mod,Q}$) of the modulating signal ($S_{mod}$) is created by using the binary bit sequence, wherein the binary bit sequence or a bias-free version of the binary bit sequence and a time-shifted image of the binary bit sequence that has been multiplied with a sine of the given period are added.

8. The method according to claim 4, wherein two optical probe signals ($S_{probe,i}$) are created by using a Mach-Zehnder modulator, (a) wherein the modulating signal ($S_{mod}$) is created by using a binary bit sequence having a predetermined number of bits, wherein the binary bit sequence or a bias-free version of the binary bit sequence and a time-shifted image of the binary bit sequence that has been multiplied with a plus-minus bit sequence having a given period are added, and (b) wherein the modulating signal ($S_{mod}$) is fed to the Mach-Zehnder modulator.

9. The method according to claim 8, wherein the time-shifted binary bit sequence is multiplied by a constant factor, preferably by 1.4, in order to obtain more equal amplitudes of the correlation peaks.

10. The method according to claim 6, wherein the binary bit sequences are represented by two or more equidistant samples per bit (oversampled).

11. The method according to claim 1, wherein the absolute value or a value range or a change of a value or value range of the parameter to be sensed is determined by (a) calculating an assessment dependency comprising at least one ratio of amplitudes of the reflection signals ($S_{ref,i}$) detected;

(b) translating the assessment dependency to a frequency shift of the frequency-dependent course of the reflectivity of the at least one optical sensor from a center position using a translation dependency that is obtained by a calibration process or by simulation; and (c) translating the frequency shift to the absolute value or a value range or the change of the value or value range of the parameter to be sensed using a further translation dependency that is obtained by a calibration process or by simulation.

12. The method according to claim 11, wherein at least one assessment dependency is used having the form $$RP\varphi = \arctan\frac{C_2}{C_1} + \text{sign}(C_2) \cdot [1 - \text{sign}(C_1)] \cdot \frac{\pi}{2}$$

wherein $C_1$, $C_2$ designate amplitudes of the reflection signals ($S_{ref,i}$) detected, sign designates the sign function and $RP_\varphi$ designates an angle ratio parameter.

13. A device for interrogating at least one optical sensor that is provided within or connected to an optical path at a sensor position, the optical path connecting the optical sensor to a near end of the optical path, wherein the at least one optical sensor has a known frequency-dependent course of its reflectivity that is changed by a physical parameter to be sensed, especially the temperature or humidity of the environment surrounding the optical sensor or the pressure being exerted onto the optical sensor, the device comprising:

(a) a connection port configured to be connected to the near end of the optical path;

(b) an optical transmitter configured to create at least two optical probe signals ($S_{probe,i}$) having differing optical center frequencies and to feed the at least two optical probe signals ($S_{probe,i}$) to the near end of the optical path;

(c) an optical receiver configured to detect reflected optical power portions of the at least two optical probe signals ($S_{probe,i}$) (optical reflection signals ($S_{ref,i}$)) created by the at least one optical sensor depending on its frequency-dependent course of the reflectivity and the optical frequencies of the at least two optical probe signals ($S_{probe,i}$); and (d) a control device which is connected to the optical transmitter and the optical receiver and which is configured:
(i) to assign each optical reflection signal ($S_{ref,i}$) detected to one of the at least one optical sensor and a correct optical frequency to each optical reflection signal ($S_{ref,i}$) detected using a known round-trip delay of the at least two optical probe signals ($S_{probe,i}$) between the near end and the respective sensor position and/or using the time shift relation between the at least two optical probe signals ($S_{probe,i}$); and
(ii) to determine an absolute value or a value range or a change of a value or value range of the parameter to be sensed from the presence of one or more of the following physical conditions:
the optical reflection signals ($S_{ref,i}$) or the maximum optical power or the optical energy thereof,
the frequency-dependent course of the reflectivity of the at least one optical sensor and its dependency on the parameter to be sensed, and
the optical frequency of each of the optical reflection signals ($S_{ref,i}$) detected, or
from one or more dependencies that link these physical conditions;
wherein the optical transmitter is configured to create the at least two optical probe signals ($S_{probe,i}$) in such a way that they are time-shifted versus each other in a predetermined manner when being fed to the near end of the optical path.

14. The device according to claim 13, wherein the optical transmitter, the optical receiver and the control device are configured to carry out the method comprising the steps of:
(a) feeding at least two optical probe signals ($S_{probe,i}$) having differing optical center frequencies to the near end of the optical path,
(i) wherein the at least two optical probe signals ($S_{probe,i}$) are time-shifted versus each other in a predetermined manner when being fed to the near end of the optical path, or
(ii) wherein a predetermined time shift between the at least two optical probe signals ($S_{probe,i}$) or corresponding optical reflection signals ($S_{ref,i}$) is introduced within the optical path or within an optical receiver using a chromatic dispersion generating component;
(b) detecting reflected optical power portions of the at least two probe signals (optical reflection signals ($S_{ref,i}$)) created by the at least one optical sensor depending on its frequency-dependent course of the reflectivity and the optical frequencies of the at least two optical probe signals ($S_{probe,i}$), assigning each optical reflection signal ($S_{ref,i}$) detected to one of the at least one optical sensor and assigning the correct optical frequency to each optical reflection signal ($S_{ref,i}$) detected using a known round-trip delay of the at least two optical probe signals ($S_{probe,i}$) between the near end and the respective sensor position and/or using the time shift relation between the at least two optical probe signals ($S_{probe,i}$); and (c) determining an absolute value or a value range or a change of a value or value range of the parameter to be sensed using the presence of one or more of the following physical conditions:
the optical reflection signals ($S_{probe,i}$) or the maximum optical power or the optical energy thereof,
the frequency-dependent course of the reflectivity of the at least one optical sensor and its dependency on the parameter to be sensed, and
the optical frequency of each of the optical reflection signals ($S_{ref,i}$) detected,
or using one or more dependencies that link these physical conditions.

15. A device for interrogating at least one optical sensor that is provided within or connected to an optical path at a sensor position, the optical path connecting the optical sensor to a near end of the optical path, wherein the at least one optical sensor has a known frequency-dependent course of its reflectivity that is changed by a physical parameter to be sensed, especially the temperature or humidity of the environment surrounding the optical sensor or the pressure being exerted onto the optical sensor, the device comprising:
(a) a connection port configured to be connected to the near end of the optical path;
(b) an optical transmitter configured to create at least two optical probe signals ($S_{probe,i}$) having differing optical center frequencies and to feed the at least two optical probe signals ($S_{probe,i}$) to the near end of the optical path;
(c) an optical receiver configured to detect reflected optical power portions of the at least two optical probe signals ($S_{probe,i}$) (optical reflection signals ($S_{ref,i}$)) created by the at least one optical sensor depending on its frequency-dependent course of the reflectivity and the optical frequencies of the at least two optical probe signals ($S_{probe,i}$); and
(d) a control device which is connected to the optical transmitter and the optical receiver and which is configured:
(i) to assign each optical reflection signal ($S_{ref,i}$) detected to one of the at least one optical sensor and a correct optical frequency to each optical reflection signal ($S_{ref,i}$) detected using a known round-trip delay of the at least two optical probe signals ($S_{probe,i}$) between the near end and the respective sensor position and/or using the time shift relation between the at least two optical probe signals ($S_{probe,i}$); and
(ii) to determine an absolute value or a value range or a change of a value or value range of the parameter to be sensed from the presence of one or more of the following physical conditions:
the optical reflection signals ($S_{ref,i}$) or the maximum optical power or the optical energy thereof,
the frequency-dependent course of the reflectivity of the at least one optical sensor and its dependency on the parameter to be sensed, and
the optical frequency of each of the optical reflection signals ($S_{ref,i}$) detected, or
from one or more dependencies that link these physical conditions;
wherein the optical transmitter is configured:
(i) to create the at least two optical probe signals ($S_{probe,i}$) simultaneously revealing no time shift; or (ii) to create at least one optical probe signal ($S_{probe,i}$) in such a way to comprise two identical images with an identical course over time but at differing optical center frequencies; and (e) a chromatic dispersion generating component is provided within the optical path or within the optical receiver which is configured to create a predetermined time shift between the at least two optical probe signals ($S_{probe,i}$) or between the images of the optical probe signal ($S_{probe,i}$) or the respective optical reflection signals ($S_{ref,i}$).

16. The device according to claim 15, wherein the optical transmitter, the optical receiver and the control device are configured to carry out the method comprising the steps of:

(a) feeding at least two optical probe signals ($S_{probe,i}$) having differing optical center frequencies to the near end of the optical path,
 (i) wherein the at least two optical probe signals ($S_{probe,i}$) are time-shifted versus each other in a predetermined manner when being fed to the near end of the optical path, or
 (ii) wherein a predetermined time shift between the at least two optical probe signals ($S_{probe,i}$) or corresponding optical reflection signals ($S_{ref,i}$) is introduced within the optical path or within an optical receiver using a chromatic dispersion generating component;

(b) detecting reflected optical power portions of the at least two probe signals (optical reflection signals ($S_{ref,i}$)) created by the at least one optical sensor depending on its frequency-dependent course of the reflectivity and the optical frequencies of the at least two optical probe signals ($S_{probe,i}$), assigning each optical reflection signal ($S_{ref,i}$) detected to one of the at least one optical sensor and assigning the correct optical frequency to each optical reflection signal ($S_{ref,i}$) detected using a known round-trip delay of the at least two optical probe signals ($S_{probe,i}$) between the near end and the respective sensor position and/or using the time shift relation between the at least two optical probe signals ($S_{probe,i}$); and (c) determining an absolute value or a value range or a change of a value or value range of the parameter to be sensed using the presence of one or more of the following physical conditions:
 the optical reflection signals ($S_{probe,i}$) or the maximum optical power or the optical energy thereof,
 the frequency-dependent course of the reflectivity of the at least one optical sensor and its dependency on the parameter to be sensed, and
 the optical frequency of each of the optical reflection signals ($S_{ref,i}$) detected,
or using one or more dependencies that link these physical conditions.

* * * * *